United States Patent
Boag et al.

(10) Patent No.: US 6,263,096 B1
(45) Date of Patent: Jul. 17, 2001

(54) MULTILEVEL DOMAIN DECOMPOSITION METHOD FOR FAST REPROJECTION OF IMAGES

(75) Inventors: Amir Boag, Yavne (IL); Yoram Bresler; Eric Michielssen, both of Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/419,415

(22) Filed: Oct. 15, 1999

Related U.S. Application Data

(63) Continuation-in-part of application No. 09/338,092, filed on Jun. 23, 1999.

(51) Int. Cl.$^7$ ...................................................... G06K 9/00
(52) U.S. Cl. ............................................. 382/128; 378/65
(58) Field of Search ................................... 382/128, 130; 378/4, 8, 19, 65

(56) References Cited

U.S. PATENT DOCUMENTS

| | | | |
|---|---|---|---|
| 4,042,811 | 8/1977 | Brunnett et al. | 235/151.3 |
| 4,149,247 | 4/1979 | Pavkovich et al. | 364/414 |
| 4,217,641 | 8/1980 | Naparstek | 364/414 |
| 4,491,932 | 1/1985 | Ruhman et al. | 364/900 |
| 4,616,318 | 10/1986 | Crawford | 364/414 |
| 4,626,991 | 12/1986 | Crawford et al. | 364/414 |
| 4,709,333 | 11/1987 | Crawford | 364/414 |
| 4,714,997 | 12/1987 | Crawford et al. | 364/414 |
| 4,718,010 * | 1/1988 | Fujii | 378/5 |
| 4,858,128 | 8/1989 | Nowak | 364/413.13 |
| 4,930,076 | 5/1990 | Meckley | 364/413.21 |
| 4,991,093 | 2/1991 | Roberge et al. | 364/413.15 |
| 5,008,822 | 4/1991 | Brunnett et al. | 364/413.21 |
| 5,136,660 | 8/1992 | Flickner et al. | 382/46 |
| 5,224,037 | 6/1993 | Jones et al. | 364/413.19 |
| 5,229,934 | 7/1993 | Mattson et al. | 364/413.21 |
| 5,243,664 | 9/1993 | Tuy | 382/6 |

(List continued on next page.)

FOREIGN PATENT DOCUMENTS 611181    8/1994   (EP) .

OTHER PUBLICATIONS

Stephan Nilsson; Fast Backprojection; Dept. of Electrical Eng., Linkopings universitet, Sweden, pp. 1–8; Jul. 4, 1996.

Per–Erik Danielsson; Iterative Techniques for Projection and Back–Projection; Dept, of Electrical Eng., Linkopings universitet, Sweden, pp. 1–28, Jun. 10, 1997.

Stephan Nilsson; Application of fast backprojection techniques for some inverse problems of integral geometry; Dept. of Mathematics, Linkopings universitet, Sweden, pp. 1–99; Jun. 19, 1997.

McCorkle et al.; "An order $N^2 \log(N)$ backprojector algorithm for focusing wide–angle wide–bandwidth arbitrary–motion synthetic aperture radar"; *SPIE* vol. 2747, pp. 25–36; 1996.

Cobb et al; "Real–time Image Formation Effort Using Quadtree Backprojection and Reconfigurable Processing"; Third Annual Federated Laboratory Symposium on Advanced Sensors; pp. 133–137; Feb. 2–4, 1999.

(List continued on next page.)

*Primary Examiner*—Joseph Mancuso
*Assistant Examiner*—Abolfazl Tabatabai
(74) *Attorney, Agent, or Firm*—Greer, Burns & Crain, Ltd

(57) ABSTRACT

The present method is a process for reprojecting, or computing tomographic projections of an image, based on multilevel image domain decomposition. The method includes decomposing an image into one or more sub-images, followed by reprojection of the sub-images into sinograms, appropriate scaling of the sinograms, and aggregation of the sub-image sinograms into a single sinogram of the entire image. The multilevel process attains image quality comparable to that of direct reprojection methods, while requiring much less computation, and therefore being much faster.

9 Claims, 7 Drawing Sheets

U.S. PATENT DOCUMENTS

| | | | |
|---|---|---|---|
| 5,253,308 | * 10/1993 | Johnson | 382/304 |
| 5,300,782 | 4/1994 | Johnston et al. | 250/363.03 |
| 5,375,156 | 12/1994 | Kuo-Petravic et al. | 378/9 |
| 5,396,528 | 3/1995 | Hu et al. | 378/14 |
| 5,438,602 | 8/1995 | Crawford et al. | 378/4 |
| 5,552,605 | 9/1996 | Arata | 250/363.04 |
| 5,559,335 | 9/1996 | Zeng et al. | 250/363.04 |
| 5,579,358 | 11/1996 | Lin | 378/4 |
| 5,625,190 | 4/1997 | Crandall | 250/363.03 |
| 5,654,820 | 8/1997 | Lu et al. | 359/298 |
| 5,727,041 | 3/1998 | Hsieh | 378/4 |
| 5,748,768 | * 5/1998 | Sivers et al. | 382/130 |
| 5,778,038 | 7/1998 | Brandt et al. | 378/4 |
| 5,796,803 | 8/1998 | Flohr et al. | 378/15 |
| 5,825,031 | * 10/1998 | Wong et al. | 250/363 |
| 5,848,114 | 12/1998 | Kawai et al. | 378/4 |
| 5,862,198 | 1/1999 | Samarasekera et al. | 378/4 |
| 5,878,102 | * 3/1999 | Kalvin | 378/4 |
| 5,901,196 | * 5/1999 | Sauer et al. | 378/4 |
| 6,026,142 | * 2/2000 | Gueziec et al. | 378/8 |
| 6,028,907 | * 2/2000 | Adler et al. | 378/4 |
| 6,108,007 | 8/2000 | Shochet | 345/430 |

OTHER PUBLICATIONS

Oh et al.; "Multi-resolution Mixed-radix Quadtree SAR Image Focusing Algorithms"; Third Annual Federated Laboratory Symposium on Advanced Sensors; pp. 139–143; Feb. 2–4, 1999.

Martin L. Brady; "A Fast Discrete Approximation Algorithm for the Radon Transform"; *SIAM J. Comput.* vol. 27, No. 1, pp. 107–119; Feb. 1998.

A. Brandt et al.; "Fast Calculation of Multiple Line Integrals"; *SIAM J. Sci. Comput.*, vol. 20, No. 4, pp. 1517–1429; 1999.

Aichi Brandt et al.; :A Fast and Accurate Multilevel Inversion of the Radon Transfrom; *SIAM J. Appl. Math.*, vol. 60, No. 2, pp. 437–462; 1999.

Carl R. Crawford; "Reprojection Using a Parallel Backprojector"; Elscint Ltd., P.O. Box 5258, Haifa, Israel; Mar. 12, 1986.

Carl R. Crawford et al.; "High Speed Reprojection and its Applications"; *SPIE* vol. 914 *Medical Imaging II*; 1988.

Per–Erik Danielsson et al.; Backprojection in $O(N^2 \log N)$ Time; *IEEE Medical Imaging Conference*, Albuquerque, NM; Nov. 12–15, 1997.

Alexander H. Delaney; "A Fast Projector–Backprojector Pair Modeling theAsymmetric, Spatially Varying Scatter Response Function for Scatter Compensation in SPECT Imaging"; *IEEE Transactions on Nuclear Science*, vol. 40, No. 4, pp. 1192–1197; Aug. 1993.

Gary H. Glover et al.; "An Algorithm for the Reduction of Metal Clip Artifacts in CT Reconstructions"; *Medical Physics*, vol. 8, No. 6, pp. 799–807; Nov./Dec. 1981.

Sung–Cheng Huang et al.; "Capability Evaluation of a Sinogram Error Detection and Correction Method in Computed Tomography"; *IEEE Transactions of Nuclear Science*, vol. 39, no. 4, pp. 1106–1110; 1992.

Eric Michielssen; "A Multilevel Matrix Decomposition Algorithm for Analyzing Scattering from Large Structures"; *IEEE Transactions on Antennas and Propagation*, vol. 44, No. 8, pp. 1086–1093; Aug. 1996.

John M. Ollinger; "Iterative Reconstruction–Reprojectiin and the Expectation–Maximization Algorithm"; *IEEE Transaction on Medical Imaging*, vol. 9, No. 1, pp. 94–98; Mar. 1990.

John M. Ollinger; "Reconstruction–Reprojection Processing of Transmission Scans and the Variance of PET Images"; *IEEE Transaction on Nuclear Science*, vol. 39, No. 4, pp. 1122–1125; 1992.

T.M. Peters; "Algorithms for Fast Back–and–Re–Projection in Computed Tomography"; *IEEE Transactions on Nuclear Science*, vol. NS–28, No. 4, pp. 3641–3646; Aug. 1981.

Jorge L.C. Sana; "Computing Projectins of Digital Images in Image Processing Pipeline Architectures"; *IEEE Transactions on Acoustics, Speech, and Signal Processing*, vol ASSP–35, No. 2, pp. 198–207; Feb. 1987.

Herman Schomberg et al.; "The Gridding Method for Image Reconstruction by Fourier Transformation"; *IEEE Transactions on Medical Imaging*, vol. 14, No. 3, pp. 596–607; Sep. 1995.

Dan–Chu Yu et al.; "Study of Reprojection Methods in Terms of Their Resolution Loss and Sampling Errors"; *IEEE Transactions on Nuclear Science*, vol. 40, No. 4, pp. 1174–1178; Aug. 1993.

G.L. Zeng; "A Rotating and Warping Projector/Backprojector for Fan–Beam and Cone–beam Itnerative Algorithm"; *IEEE Transaction on Nuclear Science*, vol. 41, No. 6, pp. 2807–2811; Dec. 1994.

* cited by examiner

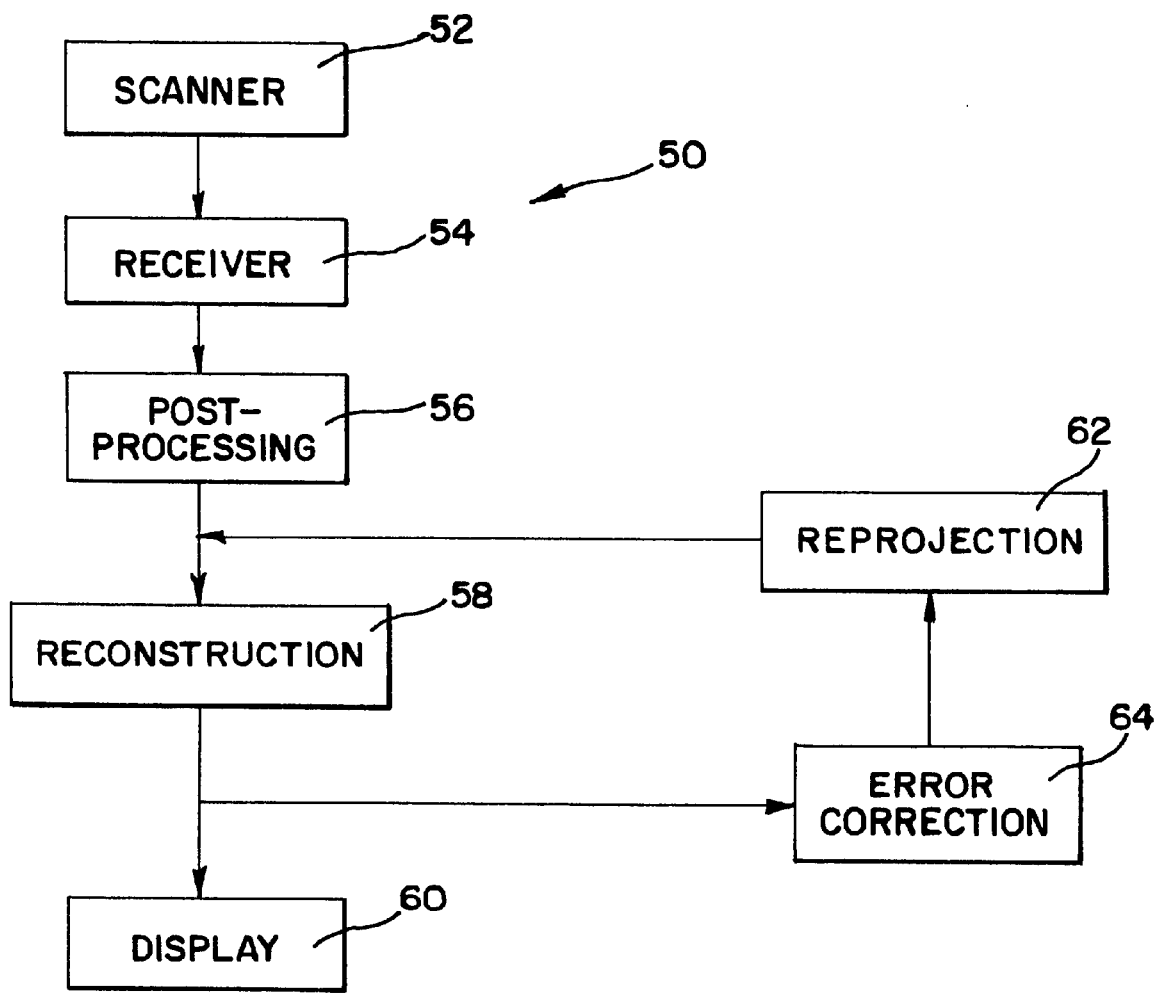

MULTILEVEL DOMAIN DECOMPOSITION METHOD FOR FAST REPROJECTION OF IMAGES

This is a continuation-in-part of Ser. No. 09/338,092, filed Jun. 23, 1999.

This invention was made with Government support under Contract Numbers NSF 9502138 and NSF 9157377 awarded by the National Science Foundation. The Government has certain rights in this invention.

FIELD OF THE INVENTION

The present invention generally concerns imaging. More specifically, the present invention concerns a method of high speed reprojection of tomographic images.

BACKGROUND OF THE INVENTION

Diagnostic imaging is an important tool for observing everything from subcellular structures to the environment, and tomographic reconstruction is an imaging technique that underlies nearly all key diagnostic imaging modalities. Such tomographic modes include X-ray Computed Tomography (CT), Positron Emission Tomography (PET), and Single Photon Emission Count Tomography (SPECT). In addition, certain acquisition methods for Magnetic Resonance Imaging (MRI) use tomography, and new techniques are emerging such as electrical impedance tomography (EIT) and optical tomography. Tomographic reconstruction is also fundamental to numerous other applications in science and engineering, including electron microscopy to determine subcellular structure, nondestructive evaluation (NDE) in manufacturing, geophysical exploration, environmental monitoring, and remote sensing.

An important component in the various tomographic reconstruction procedures is the operation of computing a set of projections of a given image, called forward projection or reprojection. Reprojection is a process by which projections are produced from an image, such that, if the projections are filtered and back projected, they yield the original image. While reprojection is widely used for various purposes, known algorithms that employ the reprojection processes incur a high computational expense.

Reprojection is of interest in several applications. Reprojection is used in X-ray CT, see, C. R. Crawford, J. G. Colsher, N. J. Pelc, and A. H. R. Lonn, "High Speed Reprojection and its Application," Proc. SPIE—Int. Soc. Opt. Eng. Conf. Medical Imaging II, Newport Beach, Calif., vol 914, pt A, pp. 311–18, 1988; in iterative beam-hardening correction algorithms, see, P. M. Joseph and R. D. Spital, "A Method for Correcting Bone Induced Artifacts in Computed Tomography Scanners," JCAT vol 2 No. 1, pp. 100–108, 1978, and U.S. Pat. Nos. 4,217,641 to Naparstek and 5,438,602 to Crawford, et al.); in streak suppression algorithms, see, G. Henrich, "A Simple Computational Method for Reducing Streak Artifacts in CT Images," Computerized Tomography, vol. 4, pp. 67–71, 1980 and U.S. Pat. No. 5,229,934 to Mattson et al.; in algorithms for the removal of artifacts caused by the presence of metallic implants in a patient, see, G. Glover and N. J. Pelc, "An Algorithm for the Reduction of Metal Clip Artifacts in CT Reconstructions." Medical Physics, vol. 8 No. 6, pp. 799–807, 1981 and U.S. Pat. No. 5,243,664 to Tuy; or other high density objects, see, U.S. Pat. No. 4,709,333 to Crawford; and in correcting for missing data, see, U.S. Pat. No. 5,396,528 to Hu et al., and partial volume effects, see, U.S. Pat No. 5,727,041 to Hsieh.

In PET and SPECT imaging, reprojection has been used to compensate for attenuation, see, J. M. Ollinger, "Reconstruction-Reprojection Processing of Transmission Scans and the Variance of PET Images," IEEE Trans. Nuc. Sci. Vol. 39 No. 4, p 1122 August 1992. Reprojection is also used in detection and compensation for various acquisition errors, see, S. C. Huang and D. C. Yu, "Capability Evaluation of a Sinogram Error Detection and Correction Method in Computed Tomography," IEEE Trans. Nuc. Sci. Vol. 39 No. 4, pp. 1106–1110 August 1992, and E. C. Frey, Z. W. Ju, and B. M. W. Tsui, "A Fast Projector-Backprojector Pair Modeling the Asymmetric, Spatially Varying Scatter Response Function for Scatter Compensation in SPECT Imaging," IEEE Trans. Nic. Sci, vol. 40, No. 4, pp. 1192–7, August 1993, including acquisition errors caused by patient motion, see, U.S. Pat. Nos. 4,858,128 to Nowak, 5,552,605 to Arata, 5,579,358 to Lin, and 5,848,114 to Kawai et al.; and in accounting for Poisson noise statistics, see, J. M. Ollinger, "Iterative Reconstruction-Reprojection and the Expectation-Maximization Algorithm," IEEE Trans. Med. Imag. Vol. 9 No. 1, p. 94 March 1990. Reprojection is also a critical component in iterative tomographic reconstruction algorithms, which are the preferred method in imaging modalities such as PET, SPECT, and nondestructive testing. Iterative tomographic reconstruction algorithms are also critical in X-ray CT algorithms for handling a variety of the aforementioned artifacts caused by the presence of metal clips in CT images.

There is a need for fast reconstruction of such tomographic images, especially with the advent of new technologies that are capable of collecting large quantities of data in real time, for example, multi-line spiral CT, cardiac imaging using X-ray CT, and an upcoming CT fluoroscopy. In addition, there exists an increasing demand for real-time interventional imaging, e.g., to monitor and guide surgery. Very often with known techniques the reconstruction of images from such data becomes a bottleneck. While it has been a subject of continuing efforts in industry and academia since the introduction of CT, known efforts to speed up tomographic reconstruction have been unsuccessful. In addition, the development of methods to speed up tomographic reconstruction has been recently identified as a major thrust area by groups such as the National Institute of Health (NIH).

Current iterative methods are far more expensive than the conventional direct filtered back projection (FBP) reconstruction, and typically require orders of magnitude more computation. This has motivated intensive work on the acceleration of iterative methods dating back to the first CT scanner around 1971, which used iterative reconstruction. More recently, the need to develop fast iterative reconstruction methods has been identified as a pressing need, see, Imaging Sciences Working Group, "Matching Clinical and Biological Needs with Emerging Imaging Technologies," tech. rep., Diagnostic Imaging Program, National Cancer Institute, 1998. Because of the key role played by the process of reprojection in the various recontruction algorithms, the importance of accelerating it has been recognized as early as 1978.

Prior methods for reprojection are problematic. Direct methods work directly on the data, and involve direct computation of weighted sums, and interpolation. Direct A) methods can be made as accurate as needed at the cost of increased computation, and serve as a benchmark in terms of accuracy. Typical examples of direct methods are described in P. M. Joseph, "An Improved Algorithm for Reprojecting Rays Through Pixel Images," IEEE Trans. Med. Imag. vol. 1, No. 3, pp. 192–198, 1982, D. C. Yu and S. C. Huang, "Study of Reprojection Methods in Terms of Their Resolution Loss and Sampling Errors," *IEEE Trans. Nuc. Sci.,* vol. 40, No. 4, p 1174, August 1993, and G. L. Zeng, Y. L. Hsieh, and G. T. Gullberg, "A Rotating and Warping Projector/Backprojector for Fan-beam and Cone-beam Iterative Algorithm," *IEEE Trans. Nuc. Sci.,* vol. 41, No. 6, pp. 2807–11, December 1994. However, in spite of various direct methods improvements, e.g., U.S. Pat. Nos. 5,559,335 to Zeng et al. and 5,625,190 to Crandall, direct methods require a high computational cost, proportional to $N^3$ (denoted $O(N^3)$), to generate N projections for an image with N×N pixels. For example, using one of these methods to compute the reprojection of a typical 4096×4096-pixel image requires $16^3$=4096 times the computation needed for a 256×256 pixel image. Thus, various efforts have increased in academia and industry in an attempt to develop fast reprojection methods.

Another typical approach to accelerating the reprojection process in commercial products is to develop special purpose hardware that attempts to increase the rate at which the reprojection is performed. Such methods are described in E. B. Hinkle, J. L. C. Sanz, A. K. Jain, and D. Petkovic, "P/sup 3/E: New Life for Projection-based Image Processing," *J. Parallel & Distrib. Comput.,* Vol. 4, No. 1, pp. 45–78, February 1987, T. M. Peters, "Algorithms for Fast Back- and Re-projection in Computed Tomography," *IEEE Trans Nuc. Sci.,* vol. NS-28, No. 4, pp. 3641–3647, August 1981, J. L. C. Sanz and E. B. Hinkle, "Computing Projections of Digital Images in Image Processing Pipeline Architectures," *IEEE Trans. Acoust., Speech & Signal Process.,* vol. ASSP-35, No. 2, pp. 198–207, February 1987, and U.S. Pat. Nos. 4,930,076 to Meckley, 5,008,822 to Brunnett el al., 5,136,660 to Flickner et al., 5,224,037 to Jones et al., and 5,559,335 to Zeng et al. Another approach described in C. R. Crawford, "Reprojection Using a Parallel Backprojector," *Medical Physics,* vol. 13, No. 4, pp. 480–483, 1986, and in U.S. Pat. No. 4,626,991 to Crawford et al., is to use a hardware backprojector, which is sometimes included in the reconstruction system, in a mode allowing the backprojector to perform a reprojection.

Such methods using special purpose hardware promise faster reconstructions than are obtainable using general purpose computers, but the special purpose hardware is expensive and offers only small factors of acceleration over less exotic implementations. The cost of implementing these methods, which typically split the work between multiple processing elements, is roughly proportional to the speedup they offer. Furthermore, with the astounding rate for increases in the performance of general purpose computers, the required special purpose architectures quickly become obsolete. For example, many modern systems no longer include a hardware backprojector, making the aforementioned method obsolete for these systems.

Another method, an analog optical processing method described in T. Lu, et al., "Projection Iterative Reconstruction Technique and Optoelectronic Implementation." *Proc. IEEE ISCAS '92,* San Diego, May 10–13, pp. 2469–2472, 1992, and U.S. Pat. No. 5,654,820 to Lu et al., uses analog optical signal processing to implement, among other functions, a tomographic reprojection. While this method may offer a large speedup, the method suffers from the same drawbacks listed above for other hardware acceleration schemes. Furthermore, being an analog processing technique, it includes well known limitations of optical analog signal processing such as limited dynamic range, nonlinearity, insufficient accuracy, and long-term drift. These limitations have restricted the use of analog optical signal processing, which has now been, for the most part, displaced by digital implementations in practically all fields of signal processing.

Other methods, such as Fast Fourier Transform (FFT) based methods proposed in C. R. Crawford, J. G. Colsher, N. J. Pelc, and A. H. R. Lonn, "High Speed Reprojection and its Application," *Proc. SPIE—Int. Soc. Opt. Eng. Conf. Medical Imaging II,* Newport Beach, Calif., vol 914, pt A, pp. 311–18, 1988, and U.S. Pat. No. 4,616,318 to Crawford, theoretically enjoy acceptable computational requirements of $O(N^2 \log N)$. These methods, however, are based on a Fourier Slice-Projection Theorem, which is the basis for Fourier Reconstruction Algorithms (FRAs). As such, they suffer from the same deficiencies that have prevented FRAs from becoming commercially viable, although they have been known and rediscovered many times for more than 30 years now.

The Fourier Slice-Projection Theorem states that the Fourier Transform along the radial coordinate of a projection at angle $\theta$ is equivalent to a slice of the two dimensional Fourier transform of the image along the direction $\theta$. A primary problem with this algorithm is the required step of interpolation between the rectangular grid in Fourier space on which the transform of the image is computed using the FFT, and the polar grid on which the Fourier transform of the projections must be evaluated. Poor theoretical properties manifest themselves in terms of severe, unacceptable artifacts in the reconstruction. The high amount of effort necessary to overcome these artifacts results in marginal or at best small, e.g., factor of 2–10, speedups over the direct techniques.

Another known method, a FFT-based reprojector-backprojector is a process for combined reprojection-backprojection, which is useful in some, but not all, iterative reconstruction algorithms. This method is described in A. H. Delaney and Y. Bresler, "A Fast and Accurate Iterative Reconstruction Algorithm for Parallel-beam Tomography," *IEEE Trans. Image Process.,* pp. 740–753, May 1996. The method is based on a principle different from the FRA, but still uses the FFT. It is accurate, and its computational requirements are $O(N^2 \log N)$. However, this algorithm is inherently restricted to a parallel-beam geometry and cannot be generalized to a fanbeam or other geometry prevalent in commercial diagnostic systems. Furthermore, the method cannot perform the reprojection operation in isolation, and therefore cannot perform many of the important functions of a reprojection algorithm.

Yet another method known as fast discrete Radon transform is a technique that performs a process similar, but not identical to reprojection. The method is described in M. L. Brady, "A Fast Discrete Approximation Algorithm for the Radon Transform," *SIAM J. Comput.,* vol. 27, No. 1, pp. 107–19, February 1998. The method computes the discrete Radon transform. The method assumes a square pixel basis for the image, and only computes projections at a fixed set of non-uniformly spaced angles. A problem exists since the transform computed by this method is not a Radon transform as considered in general tomographic applications. Rather, it is defined in terms of partial sums of pixels whose center lies within a strip of predetermined width. As such, this method may have application in certain image processing algorithms, such as a Hough transform of binary images, but is inapplicable to tomographic reconstruction.

Still another method, reduced data processing as highlighted in U.S. Pat. No. 4,714,997 to Crawford et al., does not attempt to speed up the reprojection process itself. Instead, the approach reduces processing time by using an existing reprojection system with pre- and post-processing subsystems added to enhance the operation of the reprojector. In particular, this method operates on an image with reduced spatial resolution, i.e., fewer pixels, and possibly reduced size to reproject at fewer paths than the original data set. This method may provide adequate performance in certain artifact reduction applications utilizing reprojections, however, the speedup gains the method provides without compromising accuracy are small or even negligible for the high accuracy required of state-of-the-art systems.

Referring to FIG. 1, to demonstrate the need for speedup in known reprojection techniques, a square domain is shown with side lengths D. The square domain is defined such that a two-dimensional image $f_c$ (x, y) vanishes outside the square domain, i.e., $|x| \leq D/2, |y| \leq D/2$. The image is approximated with a sufficient accuracy through interpolation of the image's N×N pixel discrete version $f(m, n)$, i.e., $$f_c(x, y) = \sum_{m,n=1}^{N} f(m, n) p\left[x - \left(m - \frac{N}{2} - \frac{1}{2}\right)\Delta, y - \left(n - \frac{N}{2} - \frac{1}{2}\right)\Delta\right],$$

where p is a pixel basis function and $\Delta = D/N$ is the discretization size.

It is presumed that, in both x and y, the support of p is proportional to $\Delta$ in size (denoted $O(\Delta)$), and p's essential bandwidth B is of $O(\Delta^{-1})$. Since p is spatially limited, p can only be essentially bandlimited, meaning that p has negligible energy outside the band. For example, the Fourier transform of an indicator function on a size $\Delta$ square pixel has a main-lobe half-width of $\Delta^{-1}$ along each frequency axis, and approximately bandwidth $B = \Delta^{-1}$. Likewise, a tensor product of cubic B-splines used in numerical experiments discussed below has support $4\Delta \times 4\Delta$ and bandwidth $\Delta^{-1}$. Alternative choices of essentially bandlimited pixel basis functions for tomography are discussed in R. M. Lewitt, "Multidimensional digital image representations using generalized Kaiser-Bessel window functions," *J. Opt. Soc. Am. A*, vol. 7, No. 10, pp. 1834–1846, October 1990. In practice, the standard pixel basis is often fi adequate, because the bandwidth of tomographic reconstruction is restricted by the filtering or convolution step of FBP.

A parallel-ray projection situation is depicted in FIG. 1. The Radon transform of the image $$f_c(r,\theta) = Rf_c(r,\theta) = \int f_c(r \cos\theta - t \sin\theta, r \sin\theta + t \cos\theta) dt$$

produces parallel-ray projections of the image over a continuous range of angles $0 \leq \theta \leq \pi$. This set of projections is often called a sinogram.

In many practical situations, the projections of $f_c$ are measured only at a set of P angles $\{\theta_i\}_{i=1}^{P}$, sometimes within a limited angular sector $|\theta| \leq \Theta$, and $O(N)$ uniformly spaced radial points $\{r_k\}$. The required reprojection operation for a given image corresponds to the calculation specified by equation (2) for all $\{\theta_i\}_{i=1}^{P}$ and $\{r_k\}$.

Let $$\tilde{p}(r,\theta) = Rp(r,\theta)$$

denote the projection of the pixel basis function. Clearly, it too has support of size $O(\Delta)$. Using the representation of equation (1), it therefore follows that computation of $f(r_k, \theta_i)$ at one view angle and one radial position requires $O(N)$ operations. Thus, the operation count of the computation of projections at P view angles and N radial positions is of $O(PN^2)$, and for a typical case where $P = O(N)$, the computational cost is of $O(N^3)$. This unfavorable cost scaling limits the use of the algorithm for many applications, and is unacceptable in iterative image reconstruction, e.g., reconstruction from limited data, which requires repeated reprojection of successive approximations of the image for angles $\{\theta_i\}$ for which the data is collected.

In view of the above, an object of the present invention is to provide an improved method that enjoys an accuracy of known direct methods, but requires less computational processing costs, i.e., a scaling of $N^2 \log N$ or better. For typical image sizes this can result in speedup by a factor of 100 or more for a standard serial processor.

Another object of the present invention is to provide a cost-effective method that can use, but does not require special purpose hardware, and is easily implemented on standard serial and parallel architectures.

Yet another object of the present invention is to provide a method that enjoys speedup without the artifacts associated with methods such as FFT-based methods.

Still another object of the present invention is to provide a method that is flexible and can be adapted to the fanbeam or other geometries prevalent in diagnostic systems.

SUMMARY OF THE INVENTION

The above-listed objects are met or exceeded by the method of the present invention, which provides a fast computational method for performing a reprojection, by computing a set of projections or angular samples of a Radon transform for a given two dimensional image. In one embodiment of the present invention, an image is divided into several sub-images which are reprojected and re-combined to create a data representation of an image. In another embodiment a recursive process is used. If an image is larger than one pixel in size, the image is divided into sub-images, which themselves are further divided into successively smaller sub-images until the sub-images are one pixel in size. When the sub-images are one pixel in size, they are reprojected. Thereafter, the resulting images are aggregated to produce the tomographic reprojected image and displayed. The aggregation ends after all of the radially shifted projected sub-images have been combined. This process is a recursive procedure, i.e., a process that permits values of the process to be calculated systematically in a finite number of steps. Computational and hardware costs of the method are low relative to the speed at which the method reproduces images.

BRIEF DESCRIPTION OF THE DRAWINGS

These and other features and advantages of the invention will be apparent to those skilled in the art with reference to the detailed description and the drawings, of which:

FIG. 11 is a block diagram of an imaging apparatus made in accordance with the principles of the present invention.

TABLE OF ACRONYMS

Figure 1:
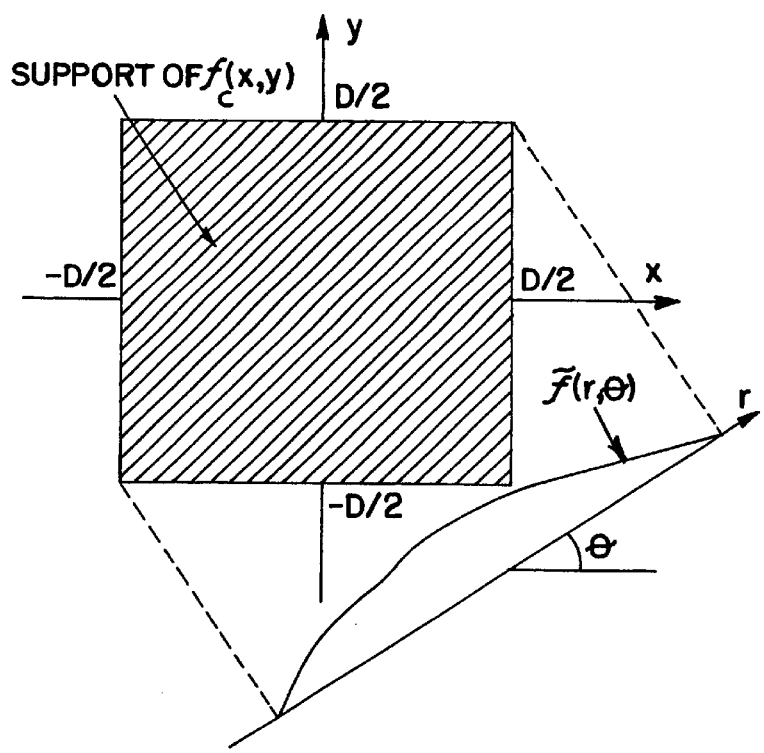
FIG. 1 is a known parallel ray projection.

This patent utilizes several acronyms. The following table is provided to aid the reader in determining the meaning of the several acronyms:

CPU=central processing unit.
CT=computed tomography.
EIT=electrical impedance tomography.
FFT=fast Fourier transform.
FRA Fourier reconstruction algorithm.
MRI=magnetic resonance imaging.
NDE=nondestructive evaluation.
NIH=National Institute of Health.
PET=positron emission tomography.
rms=root mean square.
SPECT=single photon emission count tomography.

DETAILED DESCRIPTION OF THE INVENTION

The present invention is a process that allows reprojection over a given angular range at a significantly lower cost of computer processing power and equipment. To understand the process, it is necessary to make some observations regarding the properties of a Radon transform $$f(r,\theta)=Rf_c$$

as a function of its two argument r and $\theta$.

The first two properties follow immediately from the definition of the Radon Transform. Property 1 states that the Radon Transform is a linear transformation.

Property 2 defines a shift property of the radon transform. Let $f_{c,0}(x, y)=f_c(x-x_0, y-y_0)$ denote an image shifted by the vector $(x_0, y_0)$. Then its Radon transform is a radially shifted version of $f(r,\theta)$, i.e., $$Rf_{c,0}(r,\theta)=S[x_0, y_0]f(r,\theta)=f(r-x \sin \theta+y \cos \theta,\theta)$$

where $S(x_0,y_0)$ denotes a shift operator transforming projections to a new origin displaced by the vector $(x_0,y_0)$ from the original one.

Property 3 is an angular bandlimit of a sinogram, which is a set of projections. The third property follows from a "bowtie" property, see, P. A. Rattey and A. G. Lindgren, "Sampling the 2-D Radon Transform," *IEEE Trans. Acoust. Speech, Signal Proc.*, vol. 29, no. 5, pp. 994–1002, 1981, which addresses essential support of a two dimensional Fourier transform $\tilde{F}(u_r, u_\theta)$ of the sinogram $f(r, \theta)$ with respect to its two variables r and $\theta$. Note that because $f(r, \theta)$ is periodic with respect to $\theta$, $\tilde{F}(u_r, u_\theta)$ is a line spectrum in $u_\theta$. Alternatively, a Fourier series with respect to $\theta$ can be used. Rigorous estimates for the rate at which $\tilde{F}$ vanishes outside its essential support are given in F. Natterer, "The Mathematics of Computerized Tomography," Chichester, UK: Wiley, 1986.

If $\tilde{f}(r, \theta)$ is supported in $|r|<R$ (R being the radius of the smallest disk the measured object would fit within) and $\tilde{F}(u_r, u_\theta)$ essentially vanishes for $|u_r|>B_r$, then $\tilde{F}(u_r, u_\theta)$ essentially vanishes for $|u_\theta|>Rb_r$. Thus, if $f_c$ is non-zero in the domain $|x|\leq D/2, |y|\leq D/2$, the support of $f^i$ is limited to $|r|\leq D/\sqrt{2}$.

In addition, the approximation in equation (1) of the image $f_c(x, y)$ employing interpolation functions bandlimited to a B×B square indicates that $f_c$ is essentially bandlimited with respect to its variables. By the Slice-Projection Theorem, the bandwidth of $f$ with respect to r is bounded by $$\sqrt{2}B,$$

and by Property 3, the bandwidth of $f$ with respect to $\theta$ is bounded by $$\sqrt{2}BD/\sqrt{\sqrt{2}}=DB.$$

Based on the previous discussion and the fact that $B=O(\Delta^{-1})$, Property 4 is that the minimum number of nonredundant projections are proportional to the image size N, where $N=D/\Delta$. This is the lowest sampling rate in $\theta$ required to accurately interpolate $f(r, \theta)$ to arbitrary values $\{\theta_i\}$ within the range $|\theta|\leq\Theta$.

Figure 2:
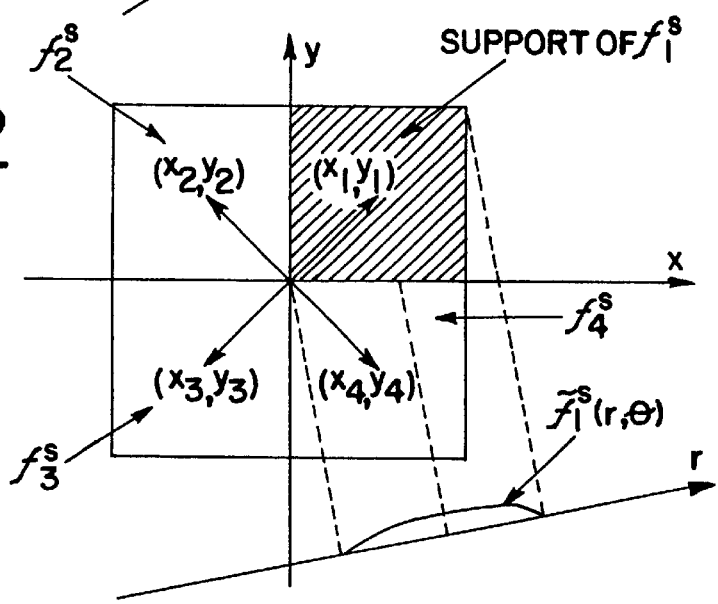
FIG. 2 is an exemplary projection of the present invention.

One embodiment of the invention performs a single level of image decomposition, as seen in FIG. 2, using Equation 2. As discussed above, known reprojection requires $cN^3$ operations, where c is a constant. Based on the above properties, however, the present invention reduces the number of operations by subdividing the image domain into a set of smaller sub-images, computing their projections, and subsequently aggregating the results to obtain the desired projections of the whole image. In this single-level domain decomposition procedure, the image $f$ is subdivided into $M^2$ sub-images of size (N/M)×(N/M).

Referring to the drawings, and particularly FIG. 2, a square domain is shown for the case of M=2. For each sub-image, according to Property 4, the projections can be computed in their local coordinate system on a coarser angular grid with O(N/M) view angles at a cost of $c(N/M)^3$. Aggregation of the projections of the sub-images requires interpolation in the angular coordinate $\theta$ followed by a shift in the radial direction r. Then, the linearity Property 1 is used in the addition of projections of the sub-images to obtain the projections of the entire image. The $\theta$-interpolation increases the angular sampling rate M-fold to conform to Property 4, since the image as a whole is M times larger than the sub-image. The cost of computing, through $\theta$-interpolation, O(N) projections, each with O(N/M) samples, is given by $c_\theta N^2/M$, where $c_\theta$ is a constant. According to Property 2 described above, the radial shift accounts for translation from the local sub-image coordinate system to that of the whole image. This radial shift is generally by a noninteger number of pixels. However, it too amounts to an interpolation with a cost of $c_r N^2/M$ operations. The total cost of the computing the projections becomes:

$$C_1=M^2[c(N/M)^3+(c_\theta+c_r)N^2/M]$$

In the above derivation, it is assumed that proper oversampling in both $\theta$ and r is applied to allow for local interpolation. Indeed, with such oversampling, the interpolation error decays exponentially with the length of an appropriately chosen interpolator; See J. J. Knab. "Interpolation of Band-Limited Functions Using the Approximate Prolate Series," *IEEE Trans. Inf. Theory*, vol. 25, No. 6, pp. 717–20, 1979, and O. M. Bucci, C. Gennarelli, and C. Savarese, "Optimal Interpolation of Radiated Fields Over the Sphere," *IEEE Trans. Antennas and Propag.*, vol 39, p. 1633, 1991. For large N, the asymptotically optimal choice of $M=[c/(c_0+c_r)]^{1/2}N^{1/2}$ implies that $C_1$ scales only as $O(N^{2.5})$, as compared with the original cost of $O(N^3)$. Both accuracy and computational burden depend upon the specific interpolation schemes employed in the projection aggregation step.

Figure 3:
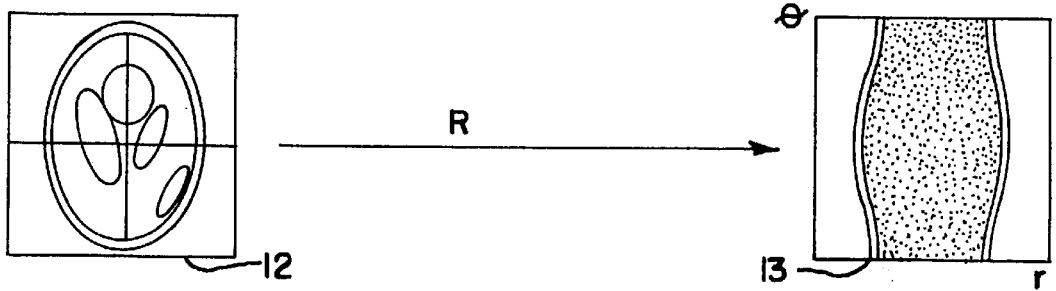
FIG. 3 is an illustration of a known reprojection process.
Figure 4:
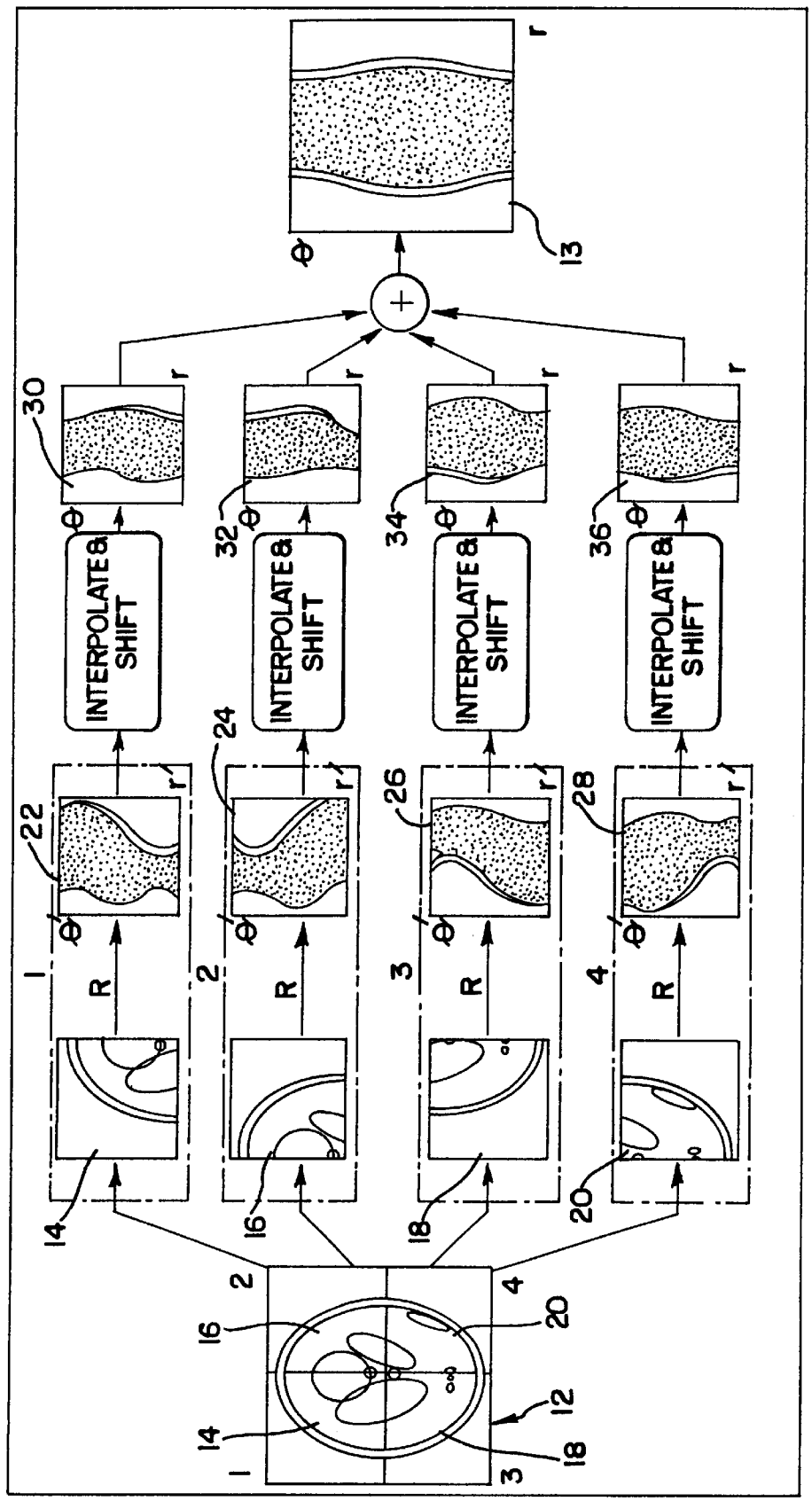
FIG. 4 is an illustration of hierarchical decomposition and reprojection performed in accordance with the principles of this invention.

This embodiment of the invention can be better understood by comparing FIG. 3 with FIG. 4. In known reprojection processes, a complete image 12 is directly reprojected into a single sinogram 13, which is a set of projections. In FIG. 4 however, the image 12 is first divided into four sub-images 14, 16, 18 and 20, which are individually reprojected into sub-sinograms 22, 24, 26 and 28, respectively. The sub-sinograms 22, 24, 26, and 28 are then angularly interpolated and radially shifted into sub-sinograms 30, 32, 34 and 36, respectively. The sub-sinograms are interpolated and shifted by effectively adjusting the scales of θ and r' in sub-sinograms 22, 24, 26 and 28 to θ and r in sub-sinograms 30, 32, 34, and 36, so that the sub-sinograms 30, 32, 34 and 36 can be summed directly to form the single sinogram 13.

In another embodiment, the $O(N^{2.5})$ computational cost is further reduced by adopting the multilevel method of the present invention instead of the single-level domain decomposition scheme. For the sake of simplifying an explanation of the present invention, it is assumed that the image size N is a power of 2, and the image $f$ is subdivided into four sub-images of equal size, as shown in FIG. 2. It should be appreciated that the process of subdividing the image into smaller and smaller sub-images can be repeated recursively, until a level with sub-images as small as a single pixel is reached. At the single pixel level, computation of projections becomes trivial since projections of the pixel basis interpolation function $\tilde{p}=Rp$ are assumed to be known analytically and only O(1) projections are needed. Thus, the process of subdivision of the present invention reduces the computation of projections to a multilevel aggregation of sub-image projections.

The aggregation process requires translation of the origin of the coordinate system, i.e., the center of rotation, from the center of a sub-image to that of the composite image. This is accomplished using the shift operator S defined in equation (3). The multilevel computational sequence of the present invention is most easily formulated as a recursive procedure. The following pseudo-code describes the computation of projections $f$ of an image $f$:

$f$=Fast_Reprojection ($f$)

if size($f$)=1×1 (one pixel) or some minimal size $f$=Direct_Reprojection ($f$)

else $f$=0 for $i$=1 to Number of sub-images $f_i^S$=Fast_Reprojection($\theta_i^S$)

$f=f+S[x_i, y_i]I^\theta f_i^S$ end for end if where $I^\theta$ denotes a θ-interpolation operator and $f_i^S$ is the ith sub-image of the image $f$. Also, $(x_i, y_i)$ denotes the center and $f_i^S$ represents the projections of $f_i^S$.

The operator $I^\theta$ doubles the number of projections through interpolation. The cost of each level of recursion is $O(N^2)$ since the number of sub-images quadruples with each level, while the amount of computations per sub-image, which is proportional to the number of pixels in the sub-image, is reduced by a factor of four. Thus, with log N levels, the computational complexity of the multilevel domain decomposition process is $O(N^2 \log N)$.

Prior to a numerical implementation of the process described in the previous section, choices must be made regarding interpolation, selection of a basis function and an amount of oversampling. These parameters are interrelated and they affect both the accuracy and complexity of the process.

Figure 5:
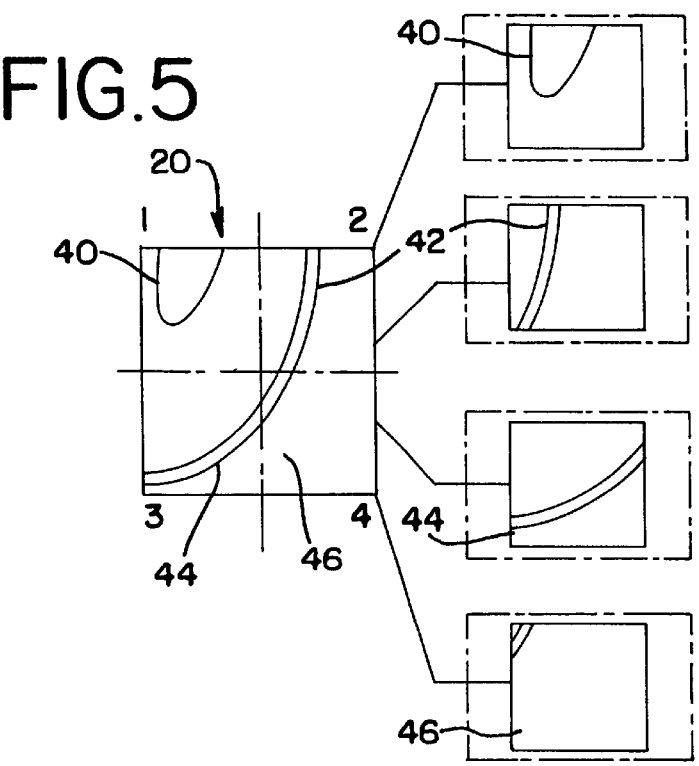
FIG. 5 is an illustration of recursive sub-image division performed on a sub-image of FIG. 4.

The structure and sequence of events in the recursive process is shown in FIG. 5. The sub-image 20 of FIG. 4 is itself subdivided into sub-images 40, 42, 44 and 46. Those subdivisions are recursively subdivided into sixteen sub-images, and the subdividing process continues until each sub-image is as small as one pixel in size. At that point, each pixel is reprojected into a sinogram, which is interpolated and shifted as required, so that when the sub-image sinograms are added together, they create the sinogram 13.

The two interpolation steps, angular interpolation in going from finer to coarser levels, and radial interpolation to account for a radial shift, will now be discussed in greater detail. As mentioned earlier, with appropriate oversampling, interpolators ensuring asymptotically exponential decay of the interpolation error with the interpolator length may be used. See J. J. Knab. "Interpolation of Band-Limited Functions Using the Approximate Prolate Series," *IEEE Trans. Inf Theory*, vol. 25, No. 6, pp. 717–20, 1979, and O. M. Bucci, C. Gennarelli, and C. Savarese, "Optimal Interpolation of Radiated Fields Over the Sphere," *IEEE Trans. Antennas and Propag.*, vol 39, p. 1633, 1991. For the sake of simplicity, only linear interpolation is implemented for both radial and angular variables. However, for moderate image sizes and only approximately bandlimited basis functions, the asymptotic behavior may not be reached, and the tradeoffs between angular and radial interpolator lengths, amounts of angular and radial oversampling, total computational cost, and the nature of the errors should be considered.

To insure accurate linear interpolation, the basis function must be sufficiently smooth and some oversampling is necessary. A basis function comprising a tensor product of the cubic B-spline found in U.S. Pat. No. 4,709,333 to Crawford, $$p(x,y)=b(x/\Delta)\ b(y/\Delta)$$

is chosen for its good approximation and smoothness properties. Recall that the cubic B-spline is defined by a quadruple convolution of unit pulse, namely, $b=b_0*b_0*b_0*b_0$, where $b_o(t)=1$ for $|t|\leq \frac{1}{2}$ and zero otherwise.

Figure 6:
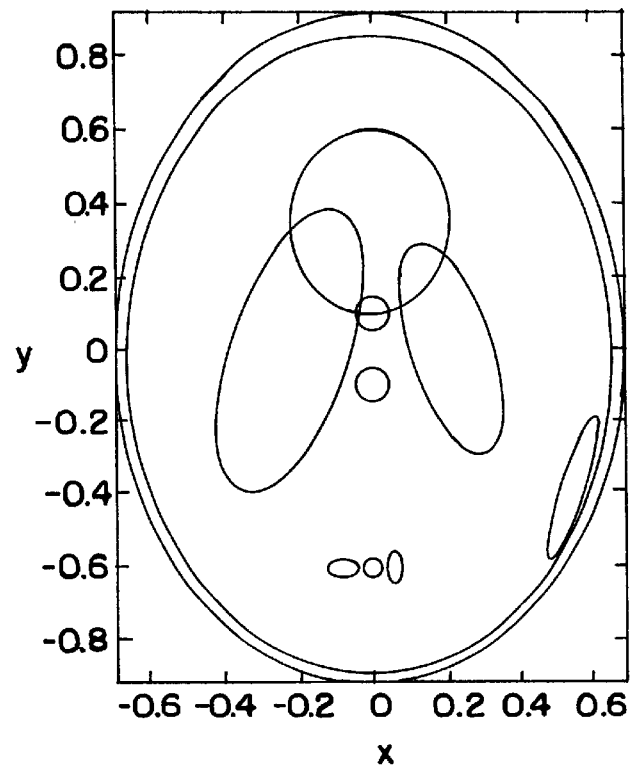
FIG. 6 is a display of the geometry of the Shepp-Logan phantom that was used to illustrate the operation of the present invention.

Referring now to FIG. 6, a known Shepp-Logan phantom is shown, see L. A. Shepp and B. F. Logan, "The Fourier Reconstruction of a Head Section," *IEEE Trans. Nucl. Sci.*, vol. 21, no. 1, pp. 21–43, 1974. The Shepp-Logan phantom was chosen to demonstrate the effectiveness of the present invention. Projections of the Shepp-Logan phantom computed by a known direct projection and using the process of the present invention for N=256 are shown as contour plots in FIGS. 7a and 7b, respectively. As is evident from a visual comparison of FIGS. 7a and 7b, the method of the present invention provides an accurate projection. In addition, numerical experiments have shown that the accuracy of the reprojection depends on the amount of angular and radial oversampling. FIG. 7b presents results for a four-fold oversampling in the radial and angular directions.

Figure 7A:
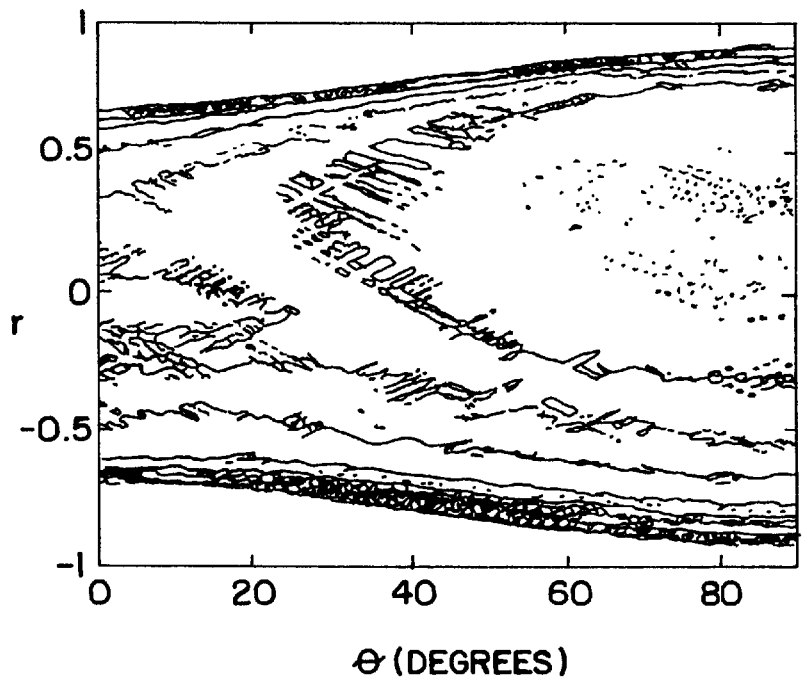
FIGS. 7a and 7b are sinogram projections of the Shepp-Logan phantom of FIG. 6, computed by the fast process of the present invention and known direct reprojection, respectively.
Figure 7B:
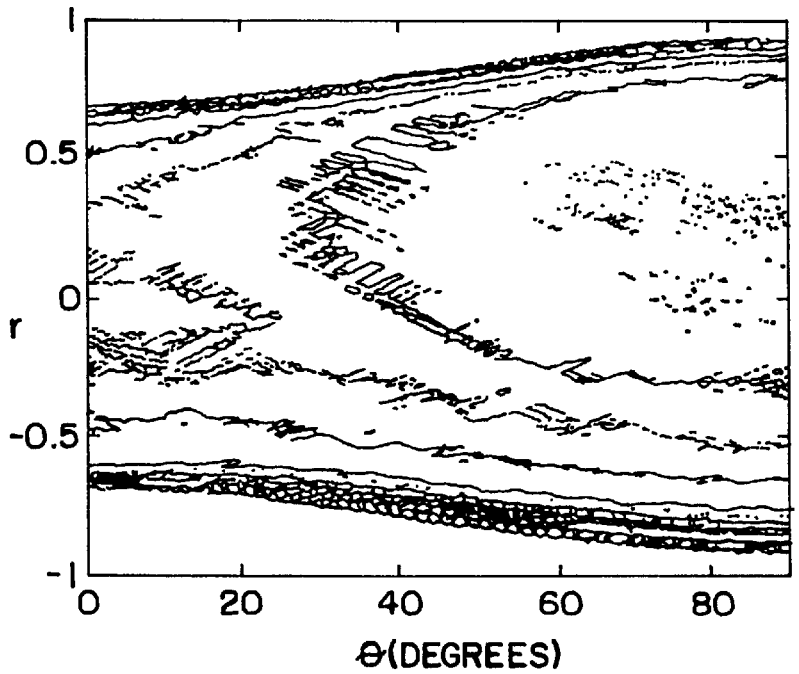
Figure 8A:
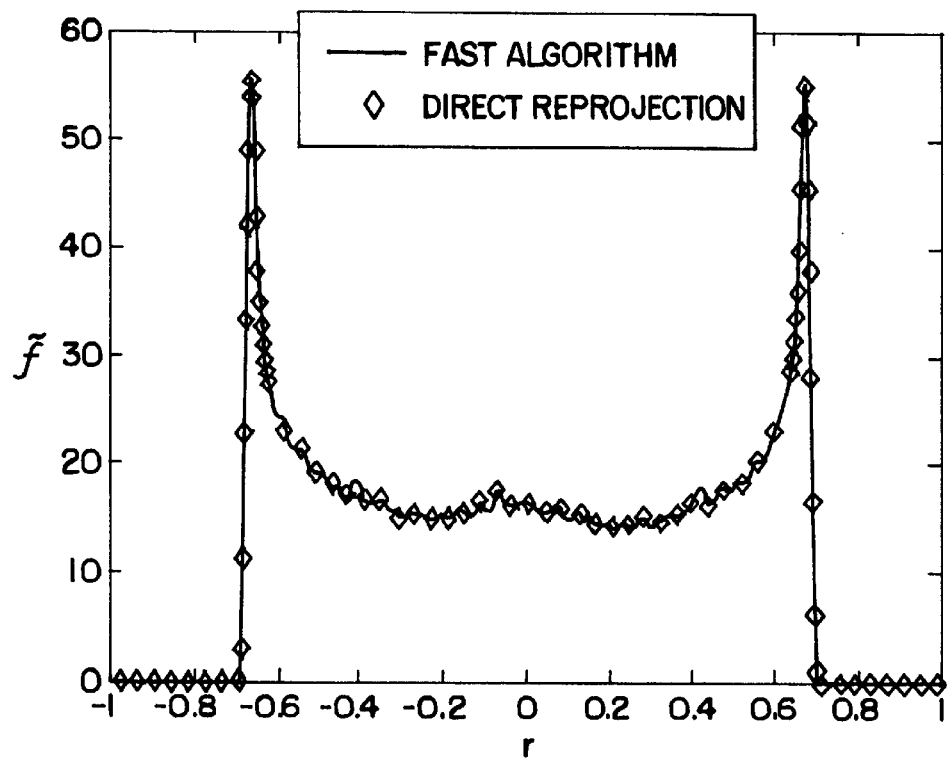
FIGS. 8a and 8b are cross-sections of the sinograms of FIGS. 7a and 7b, respectively, for $f(r, \theta=0)$ and $f(r, =0,\theta)$, respectively.
Figure 8B:
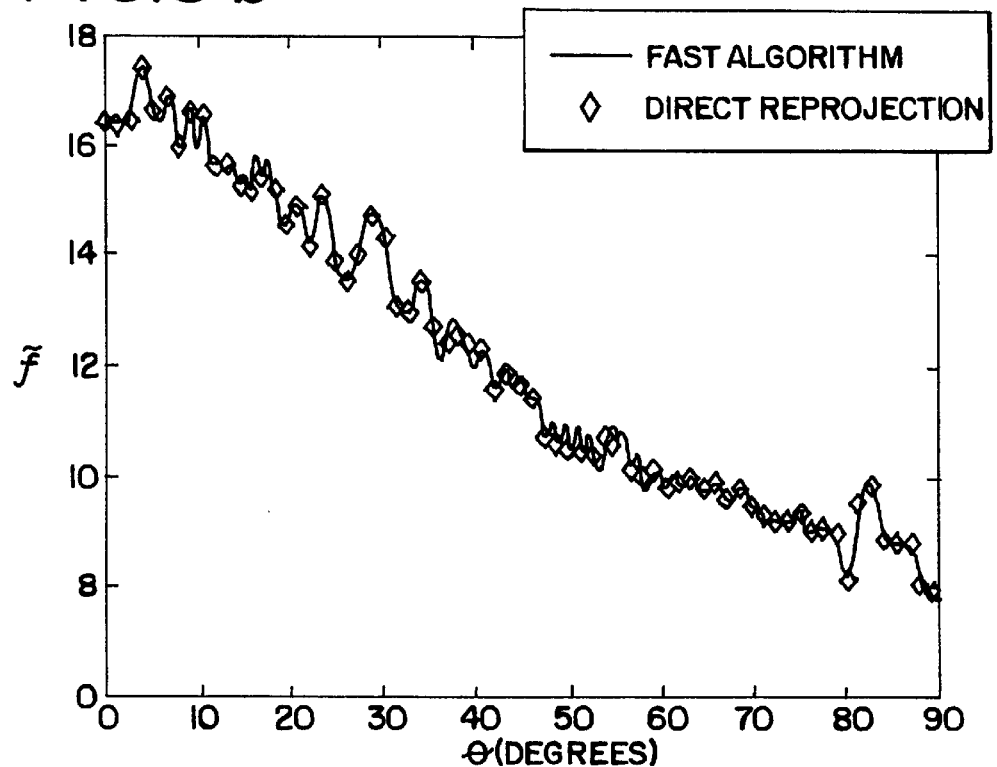

Referring now to FIGS. 8a and 8b, two cross-sections of the sinograms presented in FIGS. 7a and 7b are shown, namely, $f(r, \theta=0)$ and $f(r=0, \theta)$. Solid lines refer to the fast process of the present invention and diamonds refer to known direct reprojection. The results obtained by the multilevel process of the present invention visibly coincide with the known direct reprojection. Thus, the accuracy of the present invention is verified numerically.

To measure the accuracy of the reprojection, a normalized root mean square (rms) error is defined, $$\Delta_{rms} = \left( \frac{\sum_{ij} (\tilde{f}_{ij}^F - \tilde{f}_{ij}^D)^2}{\sum_{ij} (\tilde{f}_{ij}^D)^2} \right)^{1/2}$$

where $$\tilde{f}_{ij}^F$$

and $$\tilde{f}_{ij}^D$$

denote the projections computed by the fast process of the present invention and by known direct reprojection, respectively. Here, indices i and j correspond to the sampled angular and radial directions, respectively.

Figure 9:
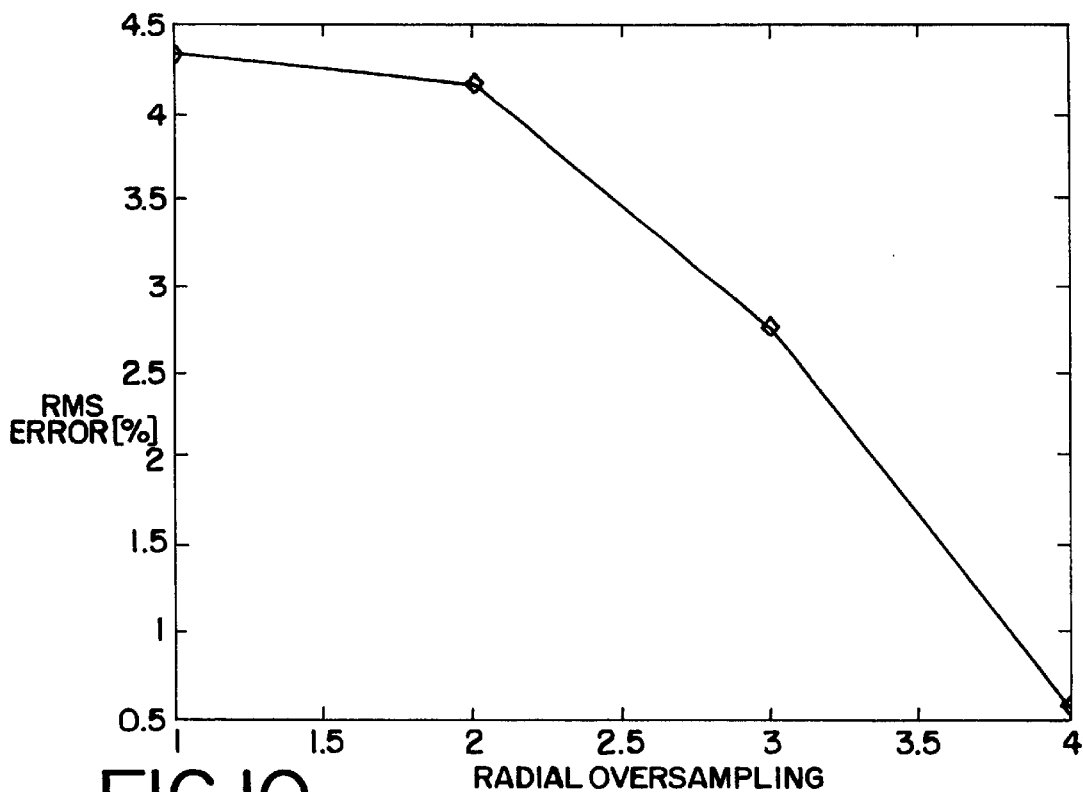
FIG. 9 is a plot of a root mean square (rms) reprojection error $\Delta_{rms}$ versus an amount of radial oversampling for the Shepp-Logan phantom of FIG. 6.

Referring to FIG. 9, a plot of $\Delta_{rms}$ versus the amount of oversampling in r is shown for four fold angular oversampling in θ. Better performance tradeoffs may be possible at reduced oversampling factors by employing optimal interpolation schemes, see, J. J. Knab, "Interpolation of Band-Limited Functions Using the Approximate Prolate Series," *IEEE Trans. Inf. Theory*, vol. 25, No. 6, pp. 717–20, 1979 and O. M. Bucci, C. Gennarelli, and C. Savarese, "Optimal Interpolation of Radiated Fields Over the Sphere," *IEEE Trans. Antennas and Propag.*, vol. 39, p. 1633, 1991.

Figure 10:
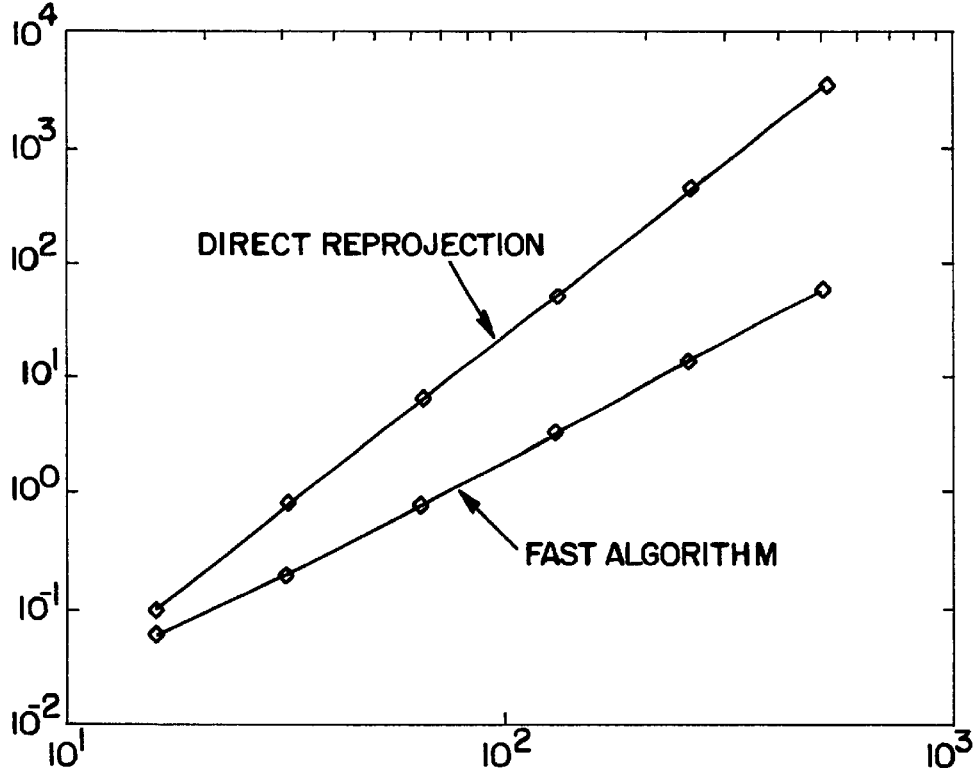
FIG. 10 is a plot comparing central processing unit (CPU) time versus an image size N for computing projections via known direct reprojection and the method of the present invention.

The computational advantages of the present invention are verified by considering images of various sizes. In FIG. 10, CPU time versus the image size N is shown for computing projections via known direct reprojection and the fast process of the present invention. The slope of the direct reprojection curve corresponds to the expected $O(N^3)$ behavior. Also, the observed trend of the fast process curve supports the estimated $O(N^2 \log N)$ complexity of the process of the present invention. Thus, it is evident from the plot that the present invention achieves faster results than known direct reprojection.

Imaging apparatus 50 made in accordance with the principles of this invention At is shown in FIG. 11. The imaging apparatus 50 could be a CT scanner or a variety of other imaging devices. The imaging apparatus 50 includes a scanner 52, which generates raw data from an object such as a head. The data is sent to a receiver 54, and then to a post-processing apparatus (or step) 56. Processing such as re-binning can be performed in the post-processing apparatus 56. The output of the post-processing apparatus 56 is reconstructed in apparatus (or step) 58 and the resulting image is displayed in display apparatus 60. However, if the image has artifacts (due to, e.g., a piece of metal in a head), the resulting errors can be removed by feeding the image to error correction apparatus (or step) 64 and reprojection apparatus (or step) 62, as previously described. The sinogram output after reprojection is fed to the input of the reconstruction apparatus (or step) 58. Reprojection and error correction are repeated until the errors caused by the artifact are corrected.

From the foregoing description, it should be understood that an improved method for reprojection, or computing tomographic projections of an image has been shown and described which has many desirable attributes and advantages. It can produce projections of the same quality as existing techniques, but hundreds of times faster. The invention can speedup key functions, and therefore the entire reconstruction in tomographic scanners, e.g., CT, PET, SPECT, without requiring expensive special-purpose computer hardware. Nonetheless, it can be implemented in special purpose hardware producing the same quality projections but much faster than special purpose hardware systems of similar cost.

While a particular embodiment of the present invention's method has been shown and described, it will be appreciated by those skilled in the art that changes and modifications may be made thereto without departing from the invention in its broader aspects and as set forth in the following claims.

What is claimed is:

1. A method for reprojecting an image in electronic form into an image sinogram, the method comprising the steps of:
   dividing the image into sub-images;
   reprojecting said sub-images by computing sub-image sinograms of each of said sub-images; and
   aggregating results of the sub-image reprojecting step to obtain the image sinogram.

2. The method according to claim 1, wherein said reprojection includes performing a Radon transform on said sub-images to compute said sub-image sinograms, and said aggregation step includes;
   interpolating said sub-image sinograms;
   shifting said interpolated sub-image sinograms in a radial direction; and
   adding said shifted, interpolated sub-image sinograms to obtain the image sinogram.

3. The method of claim 1 comprising the additional steps of
   recursively sub-dividing said sub-images until said sub-images are as small as one pixel in size, and then performing said computing and said aggregating steps.

4. The method of claim 3 wherein said aggregating step is performed recursively.

5. The method of claim 4 wherein said dividing step, said reprojecting step and said aggregating steps are performed according to the following psuedocode:

$f$=Fast_Reprojection $(f)$

```
if size(f)=1×1 (one pixel) or some other desired minimum size f=Direct_Reprojection (f)

else f=0 for i=1 to Number of sub-images f_i^S=Fast_Reprojection(θ_i^S)

f=f+S[x_i, y_i]f^θ f_i^S end for
end if.
```

6. The method of claim 5 wherein at least one of said steps is performed in special purpose hardware.

7. Apparatus for creating an image of an object comprising:

a scanner which generates data from the object;

a processor for creating at least one projection of the image from the scanner data;

means for reconstructing the image from the at least one projection;

means for reprojecting;

means for detecting errors in the image produced by the reconstruction means;

the reprojecting means reprojecting the image after error correction by dividing the image into sub-images, reprojecting said sub-images into sub-image sinograms, and aggregating said sub-image sinograms to obtain the image sinogram, means for feeding the corrected image to said reconstruction means; and means for displaying the image created by the reconstruction means after the errors are corrected.

8. The method of claim 2 wherein said shifts involve interpolation.

9. The method of claim 2 wherein said interpolation involves different accuracies.

* * * * *

UNITED STATES PATENT AND TRADEMARK OFFICE
CERTIFICATE OF CORRECTION

PATENT NO. : 6,263,096 B1
DATED : July 17, 2001
INVENTOR(S) : Boag et al.

It is certified that error appears in the above-identified patent and that said Letters Patent is hereby corrected as shown below:

<u>Title page,</u>
Item [56], References Cited, delete "5,136,660" and add -- 6,136,660 --, delete "Jorge L.C. Sana" and add -- Jorge L.C. Sanz --, delete "Alexander H. Delaney; " A Fast Projector-Backprojector Pair Modeling the Asymmetric, Spatially Varying Scatter Response Function for Scatter Compensation in SPECT Imaging"; *IEEE Transactions on Nuclear Science*, vol. 401, No. 4, pp. 1192-1197; Aug. 1993." and add
-- Alexander H. Delaney; "A Fast and Accurate Fourier Algorithm for Iterative Parallel-Beam Tomography"; IEEE Transactions on Image Processing, vol. 5, No. 5, pp. 740-753; May 1996. -- and add -- E.C. Frey et al; "A Fast Projector-Backprojector Pair Modeling the Asymmetric, Spatially Varying Scatter Response Function for Scatter Compensation in SPECT Imaging"; IEEE Transaction on Nuclear Science, Vol. 40, No. 4, pp. 1192-1197; August 1993. --.

<u>Column 2,</u>
Line 60, delete "A)".

<u>Column 5,</u>
Line 40, delete "$f_1$".
Line 47, delete "$f_c(r,\theta)$" and add -- $\tilde{f}_c(r,\theta)$ --.
Line 64, delete "$f(r_k,\theta_i)$" and add -- $\tilde{f}(r_k,\theta_i)$ --.

<u>Column 7,</u>
Line 2, delete "$f(r,\theta=0)$" and add -- $\tilde{f}(r,\theta=0)$ --.
Line 2, delete "$f(r,=0,\theta)$" and add -- $\tilde{f}(r=0,\theta)$ --.
Line 24, after "FRA" insert -- = --.
Line 41, delete "$f(r,\theta) = Rf_c$" and add -- $\tilde{f}(r,\theta) = Rf_c$ --.
Line 51, delete "$f(r,\theta)$" and add -- $\tilde{f}(r,\theta)$ --.

Line 55, delete "$R_{f_{c,0}}(r,\theta) = S[x_0,y_0]f(r,\theta) = f(r - x\sin\theta + y\cos\theta,\theta)$" and add
-- $R_{f_{c,0}}(r,\theta) = S[x_0,y_0]\tilde{f}(r,\theta) = \tilde{f}(r - x\sin\theta + y\cos\theta,\theta)$ --.

Line 66, delete "$f(r,\theta)$" and add -- $\tilde{f}(r,\theta)$ --.
Line 67, delete "$f(r,\theta)$" and add -- $\tilde{f}(r,\theta)$ --.

<u>Column 8,</u>
Line 11, delete "$f$" and add -- $\tilde{f}$ --.
Line 16, delete "$f$" and add -- $\tilde{f}$ --.
Line 21, delete "$f$" and add -- $\tilde{f}$ --.

UNITED STATES PATENT AND TRADEMARK OFFICE
CERTIFICATE OF CORRECTION

PATENT NO. : 6,263,096 B1
DATED : July 17, 2001
INVENTOR(S) : Boag et al.

It is certified that error appears in the above-identified patent and that said Letters Patent is hereby corrected as shown below:

Column 8 (continued),
Line 24, delete "$\sqrt{2}BD/\sqrt{2} = DB$" and add -- $\sqrt{2}BD/\sqrt{2} = DB$ --.

Line 29, delete "$f(r,\theta)$" and add -- $\tilde{f}(r,\theta)$ --.

Line 33, delete ",using Equation 2."

Column 9,
Line 26, delete "$\theta$" and add -- $\theta'$ --.

Line 54, delete "$f$" and add -- $\tilde{f}$ --.

Line 57, delete "$f = Fast\_Reprojection(f)$" and add -- $\tilde{f} = Fast\_Reprojection(f)$ --.

Line 63, delete "$f = Direct\_Reprojection(f)$" and add -- $\tilde{f} = Direct\_Reprojection(f)$ --.

Line 67, delete "$f = 0$" and add -- $\tilde{f} = 0$ --.

Column 10,
Line 5, delete "$f_i^s = Fast\_Reprojection(\theta_i^s)$" and add -- $\tilde{f}_i^s = Fast\_Reprojection(f_i^s)$ --.

Line 7, delete "$f = f + S[x_i, y_i]I^\theta f_i^s$" and add -- $\tilde{f} = \tilde{f} + S[x_i, y_i]I^\theta \tilde{f}_i^s$ --.

Line 12, delete "$f_i^s$" and add -- $\tilde{f}_i^s$ --.

Column 11,
Line 18, delete "$f(r, \theta = 0)$" and add -- $\tilde{f}(r, \theta = 0)$ --.
Line 18, delete "$f(r = 0, \theta)$" and add -- $\tilde{f}(r = 0, \theta)$ --.

Column 12,
Line 2, delete "At"
Line 66, delete "$f = Fast\_Reprojection(f)$" and add -- $\tilde{f} = Fast\_Reprojection(f)$ --.

Column 13,
Line 5, delete "$f = Direct\_Reprojection(f)$" and add -- $\tilde{f} = Direct\_Reprojection(f)$ --.

Line 10, delete "$f = 0$" and add -- $\tilde{f} = 0$ --.

Line 17, delete "$f_i^s = Fast\_Reprojection(\theta_i^s)$" and add -- $\tilde{f}_i^s = Fast\_Reprojection(f_i^s)$ --.

UNITED STATES PATENT AND TRADEMARK OFFICE
CERTIFICATE OF CORRECTION

PATENT NO. : 6,263,096 B1
DATED : July 17, 2001
INVENTOR(S) : Boag et al.

It is certified that error appears in the above-identified patent and that said Letters Patent is hereby corrected as shown below:

Column 13 (continued),
Line 19, delete "$f = f + S[x_i, y_i]I^\theta f_i^s$" and add -- $\tilde{f} = \tilde{f} + S[x_i, y_i]I^\theta \tilde{f}_i^s$ --.

Signed and Sealed this

Sixteenth Day of July, 2002

Attest:

Attesting Officer

JAMES E. ROGAN
Director of the United States Patent and Trademark Office